United States Patent

[11] 3,622,260

| [72] | Inventors | Heinrich Seibert<br>Leverkusen;<br>Peter Hoffmann, Cologne-Stammheim;<br>Ivar Ugi, Leverkusen-Schlebusch; Werner<br>Herzog, Vaihingen; Karl Kemmner,<br>Unterenzingen, all of Germany |
| --- | --- | --- |
| [21] | Appl. No. | 695,580 |
| [22] | Filed | Jan. 4, 1968 |
| [45] | Patented | Nov. 23, 1971 |
| [73] | Assignee | Farbenfabriken Bayer Aktiengesellschaft<br>Leverkusen, Germany |
| [32] | Priority | Jan. 7, 1967 |
| [33] | | Germany |
| [31] | | F 51195 |

[54] PROCESS FOR IMPROVING THE HEAT AND ACID RESISTANCE OF CELLULOSE-CONTAINING MATERIALS
3 Claims, No Drawings

[52] U.S. Cl. .................................................... 8/116.2,
8/116.4, 8/116.3, 8/120, 8/129, 252/63.7, 252/64,
317/259, 260/214, 260/231

[51] Int. Cl. ................................................... D06m 13/12,
D06m 13/38, D06m 13/54

[50] Field of Search ........................................... 252/63.7,
64; 317/259; 8/116.2, 116.4, 129, 120, 116.3;
260/214, 231

[56] References Cited
UNITED STATES PATENTS

| 1,594,982 | 8/1926 | Somerville .................. | 252/63.7 |
| --- | --- | --- | --- |
| 1,594,983 | 8/1926 | Somerville .................. | 252/63.7 |
| 2,039,837 | 5/1936 | Ralston et al. ............... | 252/63.7 |
| 2,205,840 | 6/1940 | White ......................... | 252/63.7 |
| 3,170,027 | 2/1965 | Ford ........................... | 252/64 |
| 3,322,829 | 5/1967 | Zienty et al. ................. | 252/64 |
| 3,392,183 | 7/1968 | Windmuth et al. ........... | 252/64 |
| 3,444,137 | 5/1969 | Higgenbottom et al. ..... | 252/64 |

OTHER REFERENCES
Ugi, Angewandte Chemie, Vol. 74, pp. 9–22 (1962)

*Primary Examiner*—George F. Lesmes
*Assistant Examiner*—J. Cannon
*Attorney*—Plumley, Tyner & Sandt

ABSTRACT: An amino compound containing at least one primary amino group, a carbonyl compound containing at least one aldehyde or keto group and an isonitrile compound are applied to a cellulosic material and reacted thereon. The cellulosic material so modified has increased resistance to degradation from heat and acids and is suitable as an insulator in electrical devices.

PROCESS FOR IMPROVING THE HEAT AND ACID RESISTANCE OF CELLULOSE-CONTAINING MATERIALS

As cellulose-containing materials which can be subjected to the process according to the invention the following may be mentioned, for example: cotton, cellulose, regenerated cellulose, cellulose derivatives, such as cellulose acetate, cellulose triacetate and cellulose ether, as well as paper, cardboard, woven and knitted fabrics and fleeces.

The amino compounds containing at least one primary amino group may belong to the aliphatic, cycloaliphatic, aromatic or heterocyclic series; there may be mentioned, for example: methylamine, n-butylamine, iso-butylamine, sec.-butylamine, tert.-butylamine, allylamine, stearylamine, ethanolamine, propanolamine, 3-dimethylaminopropylamine, N-(γ-aminopropyl)-morpholine, amino acetic acid ethyl ester, ε-aminocaproic acid ethyl ester, benzylamine, cyclohexylamine, aniline, p-chloroaniline, 2-naphthylamine, 5-aminoquinoline, ethylene-diamine, hexamethylene-diamine, di-0,0'-(γ-aminopropyl)-1,4-butylene glycol, di-(γ-aminopropyl)-methylamine, 1,6,11-triamino-undecane, 1,4-diamino-cyclohexane, phenylene-diamine, diamino-toluene, 4,4'-diamino-diphenylmethane, polyethylene-imine and polycaprolactams of molecular weight 500–3,000 carrying terminal amino groups. The term amino compounds containing at least one primary amino group here also includes ammonia, hydrazine and monosubstituted or asymmetrically disubstituted hydrazines, such as phenylhydrazine, hydrazinoacetic acid ethyl ester, formic acid hydrazide, acetic acid hydrazide, benzoic acid hydrazide, benzene-sulphonic acid hydrazide, nicotinic acid hydrazide, adipic acid dihydrazics; terephthalic acid dihydrazics, semicarbazide, carbonyl-dihydrazide and N,N'-dimethyl-hydrazine.

The carbonyl compounds containing at least one aldehyde or keto group may also belong to the aliphatic, cycloaliphatic, aromatic or heterocyclic series; there may be mentioned, for example: formaldehyde, acetaldehyde, propionaldehyde, β-glycidaldehyde, acrolein, polyacrolein, n-butyraldehyde, iso-butyraldehyde, β-hydroxy-butyraldehyde, -hydroxy-butyraldehyde, 2ethyl-2-hexenal-(1), stearylaldehyde, cinnamaldehyde, hydrocinnamaldehyde, o-cyano-dihydrocinnamaldehyde, benzaldehyde, 2,4-dichlorobenzaldehyde, glutardialdehyde, α-hydroxy-adipic dialdehyde and dihydropyranaldehyde, further acetone, methyl ethyl ketone, methyl vinyl ketone, dipropyl ketone, ethylisoamyl ketone, 5-methoxy-pentanone-(2), methyl-stearyl ketone, distearyl ketone, methyl-benzyl ketone, benzo-racemic acid ethyl ester, benzo-racemic acid-N-cyclohexylamide, pevulinic acid ethyl ester cyclopentanone, cylohexanone, cyclododecanone, cyclododecadienone, acetophenone and benzophenone.

The isonitrile compounds also may belong to the aliphatic, cycloaliphatic, aromatic or heterocyclic series; the following may be mentioned, for example: ethylisonitrile, allylisonitrile, n- and tert.-butylisonitrile as well as cyclohexylisonitrile, further N-(α-isocyanopropyl)-morpholine, benzylisonitrile, o- and p-tolylisonitrile, 2,6-xylylisonitrile, azobenzene-4-isonitrile, hexane-1,6-diisonitrile, cyclohexane-1,4-diisonitrile, 1,4-di-(isocyanaomethyl)-cylohexane, N-methyl-di-(γ-isocyanopropyl)-amine, N-cyclohexyl-di-(γ-isocyanopropyl)-amine, N-methl-di-(β-isocyano-β-methylpropyl)-amine, di-(β-isocyanoethyl)-carbonate, di-(β-isocyano-β-methyl-propyl)-carbonate, di-0,0'-(γ-isocyano-β,β-dimethyl-propyl)-propanediol, 1,6,11-triisocyanoundecane, 1,1,3-tri-(γ-isocyanopropul)-indence, 4,4'-di-(isocyanomethyl)-diphenyl ether, 1-methyl-3,5-diethyl benzene-2,4-diisonitrile, 4,4'-diisocyano-diphenylmethane, 2,4,4'-triisocyano-diphenyl and 2,2'-4,4'-tetra-isocyano-diphenyl.

The three components, i.e., the amino compound, the carbonyl compound and the isonitrile compound, are expediently used in approximately equivalent amounts, viz., in the form of solutions or emulsions in water or in organic solvents, such as methanol, methylene chloride, acetic acid ethyl ester, methyl glycol, benzene or mixtures thereof; emulsifiers, chiefly nonionic emulsifiers, such as nonylphenol polyglycol ether, can also be used for the aqueous emulsions. Any sequence in which the three components are allowed to act may be chosen; in general, it is recommended to use the three components in admixture with one another.

Instead of using the components amino compound and carbonyl compound by themselves, it is also possible to use them in the form of the aminals or Schiff bases derived from these two components; there may be mentioned by way of example: urotropine, N,N',N'-trimethyl-hexahydrotriazine, imidazolidine, 1,1-di-(n-butylamino)-2-methylpropane, N-(methoxy-methyl)-benzylamine, N-butyl-butylidene-imine N-phenyl-benzylidene-imine, N-isobutyl-hexyidene-(2)-imine and N-benzyl 1-phenyl-ethylidene-imine.

The proportion between the total weight of the three components and the weight of the cellulose-containing materials may vary within wide limits. Suitable proportions can readily be determined by preliminary experiments; in general, it has been found sufficient when the total weight of the three components amounts to 2 to 30 percent of the weight of the cellulose-containing materials.

The treatment of the cellulose-containing materials with the components to be used according to the invention can be effected by various methods, for example, by impregnating, dipping or spraying. Subsequently, the materials are expediently washed with water or organic solvents and dried at normal or elevated temperature.

The cellulose-containing materials treated according to the invention are outstandingly improved; in particular, their resistance to such influences is increased which, such as heat and acids, can lead to a decrease of the degree of polymerization, and thus, inter alia, to a decrease of stability.

It has also been found that the cellulose-containing materials treated according to the invention can be used with special advantage as insulating materials for electrotechnical purposes; they prove to be still stable in those instances in which the critical temperatures hitherto recognized as valid are exceeded.

The fact that the cellulose-containing materials are improved by the process according to the invention, is assumedly connected with the fact that the free carboxyl groups contained in the materials are converted into carbonamide groups with the aid of the three components in accordance with the meaning of the reaction described by Ugi in Angewandte Chemie 74, 9–22 (1962).

EXAMPLE 1

100 g. cellulose previously cleaned in conventional manner by treatment with dilute sulfurous acid, are introduced into 100 g. ethanol and treated with 2 g. stearylamine, 1g. benzophenone as well as 1 g. cyclohexane-1,4-di-isonitrile at 60° C. for 30 minutes, while stirring. The cellulose is then squeezed out and washed with ethanol. The paper obtained therefrom in conventional manner is eminently suitable as insulating material for electrotechnical purposes.

EXAMPLE 2

100 g. cellulose previously cleaned in conventional manner by treatment with dilute sulfurous acid, are introduced into 100 methyl glycol, treated with a mixture of 1 g. aniline, 1 g. benzaldehyde and 2 g. azobenzene-4-isonitrile at 60° C. for 30 minutes, while stirring. The cellulose is then squeezed out and subsequently washed first with methyl glycol and thereafter with acetone. The paper obtained therefrom in conventional manner is likewise eminently suitable as insulating material for electrotechnical purposes,

EXAMPLE 3

100 g. cellulose previously cleaned in conventional manner by treatment with dilute sulfurous acid, are introduced into 100 g. water, stirred into a mixture of 2 cc. concentrated ammonia, 2 cc. 30 percent formaldehyde and 1.5 g. N-methyl-di-(γ-isocyanopropyl)-amine and allowed to stand at room temperature for 18 hours. The cellulose is then squeezed out and washed with water. Paper produced from the cellulose thus treated in conventional manner, is likewise eminently suitable as insulating material for electrotechnical purposes.

EXAMPLE 4

Unsized paper prepared from a cellulose which was cleaned in conventional manner by the treatment with dilute sulfurous acid, is impregnated on the size press with an aqueous solution containing a mixture of ethanolamine, 30 percent formaldehyde and N-methyl-di-($\gamma$isocyanopropyl)-amine in a proportion by weight 1:1:3, followed by drying in the paper machine. About 20 g. of the above mixture are allowed to act upon 1 kg. of paper; the concentration of the solution is then adjusted to the operating velocity of the paper machine and the paper thickness. The paper thus treated is substantially better suited for electrotechnical purposes than the untreated paper.

We claim:

1. A process for improving cellulose-containing materials which consists in that an amino compound containing at least one primary amino group, a carbonyl compound containing at least one aldehyde or keto group and an isonitrile compound are allowed to act upon the cellulose-containing materials.

2. Cellulose-containing materials treated according to the process of claim 1.

3. As an electrotechnical insulating material, a cellulose-containing material modified by the process of claim 1.

* * * * *